C. A. JOHANSSON.
FIRE ESCAPE.
APPLICATION FILED APR. 19, 1913.
1,116,434.
Patented Nov. 10, 1914.
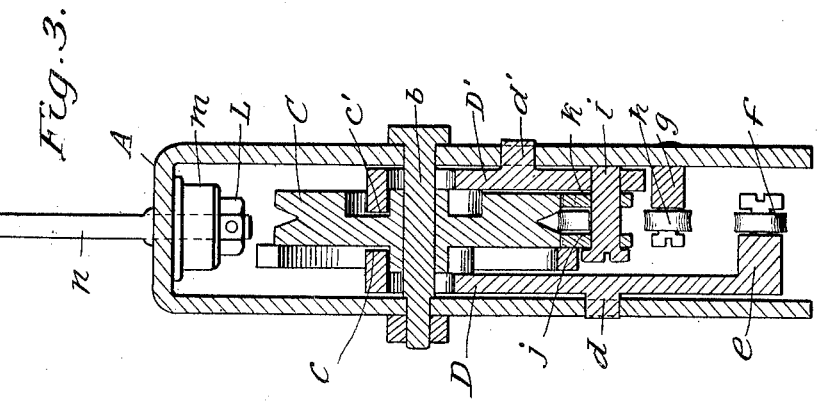
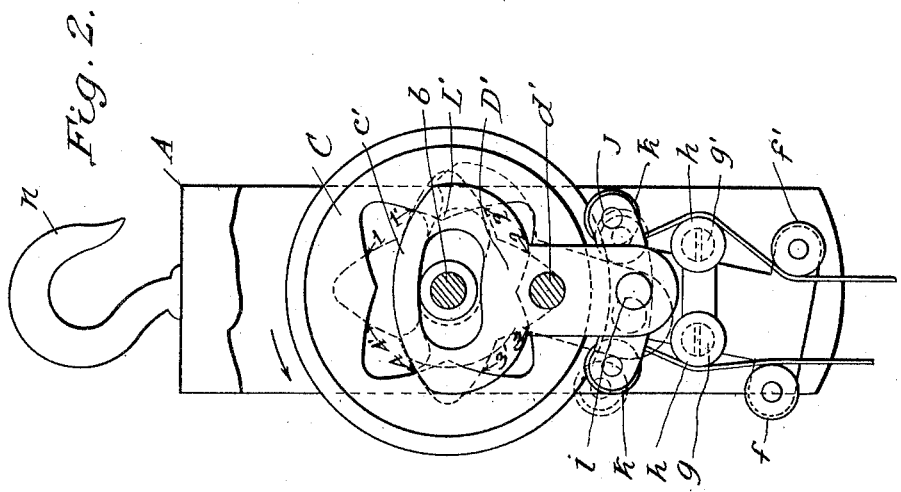
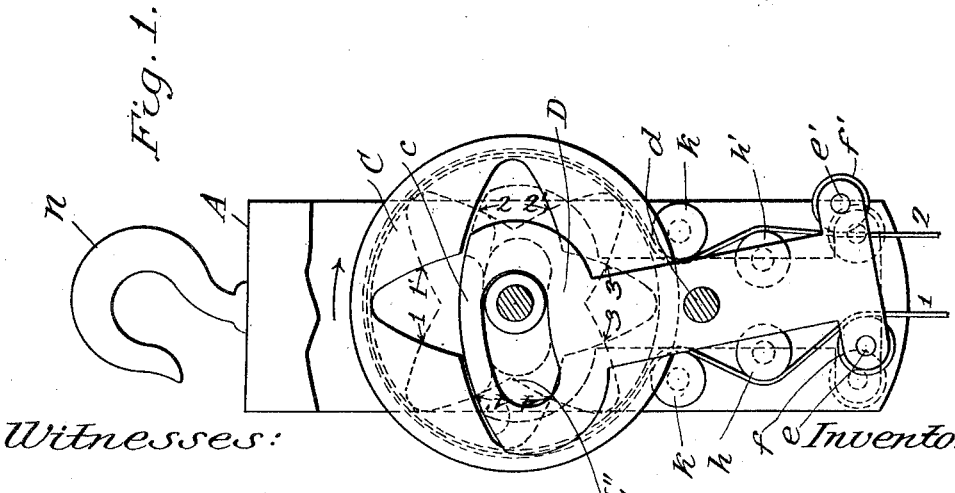
Witnesses:
E. C. Tate
C. H. Potter
Inventor:
Carl Alfred Johansson
by Byrnes Townsend & Buckenstein
Attys

UNITED STATES PATENT OFFICE.

CARL ALFRED JOHANSSON, OF CHRISTIANIA, NORWAY, ASSIGNOR OF ONE-HALF TO HANS CHRISTIAN BERNHARD CHRISTOPHERSON, OF SLEMDAL, NORWAY.

FIRE-ESCAPE.

1,116,434.  Specification of Letters Patent.  Patented Nov. 10, 1914.

Application filed April 19, 1913. Serial No. 762,391.

*To all whom it may concern:*

Be it known that I, CARL ALFRED JOHANSSON, a citizen of Sweden, residing at Christiania, Norway, have invented certain new and useful Improvements in Fire-Escapes, of which the following is a specification.

This invention relates to automatic lowering devices and particularly to those which are adaptable for use as fire-escapes.

It has for its object the provision of a device such that when a load is applied to one end of the lowering rope it will descend at a practically constant speed. The mechanism being operable in a reverse direction, when one load has reached the ground, a second load may be applied to the other end of the rope which has meanwhile been drawn up in consequence of the descent of the first load.

A further object is the provision of an escapement mechanism especially adapted to operate so as to produce this practically constant rate of descent.

The invention is illustrated in the accompanying drawings, in which:—

Figure 1 is a side elevation with the frame A broken away, viewed as from the left in Fig. 3 and showing two operating positions of the large pendulum; Fig. 2 is a side elevation with the frame A broken away, viewed as from the right in Fig. 3, and showing two operating positions of the small pendulum; and Fig. 3 is a central, vertical, transverse, sectional view, showing the supporting hook and its connection with the frame A in elevation.

As illustrated, there is fixed between the sides of a U-shaped metal frame A, a shaft $b$ on which is rotatably mounted a pulley C. This pulley has a peripheral groove in which the lowering rope runs, and, at one side, a concentric flange $n$ slightly greater in diameter than the pulley. Pulley C has in its face opposite the flange $n$ a cam recess, the walls 1, 1', 2, 2', 3, 3', 4, 4' of which form a star-shaped cam surface, as shown, having intermediate apexes L', L'', L''', L''''. The flange member $n$ has a similar but larger cam recess in its face arranged in an alternate angular relation with respect to the cam surface in the face of the pulley C. In the side of frame A adjacent the pulley flange $n$ there is journaled, on stud $d$, a pendulum arm D, on the lower end of which there is rigidly mounted at right angles to the axis of arm D a horizontally-extending lug in which are fastened pins $e$ carrying guiding rollers $f$, $f'$. These rollers $f$, $f'$ are located at equal distances from the central axis of the arm D. The upper enlarged end of pendulum D is of an oval shape and has in it a curved slot through which the shaft $b$ projects and, at its extreme upper end, a lug $c$ which projects into the cam recess in the pulley flange $n$. The curvature of the upper face of pendulum D and that of the lug $c$ is the same as that of the walls of the cam recess into which lug $c$ projects.

In the side of frame A adjacent the recess in pulley C there is journaled on the stud $d'$ a similar but shorter pendulum arm D' which has, on its lower end, a horizontally-extending cross-bar $j$ pivotally mounted on stud I attached to pendulum D', said cross-bar $j$ having at each end thereof pins carrying clamping rollers $k$, $k'$, which are spaced at equal distances on each side of the pivot. These clamping rollers $k$, $k'$ are positioned just below the peripheral groove in the pulley C. The distance between guiding rollers $f$, $f'$ is the same as that between the clamping rollers $k$, $k'$. Rigidly mounted on a lug which extends inwardly from the side of frame A adjacent the recess in pulley C are two pins $g$, $g'$ carrying guiding rollers $h$, $h'$, which are positioned between the guiding rollers $f$, $f'$ and clamping rollers $k$, $k'$ being slightly nearer the clamping rollers $k$, $k'$ than the guiding rollers $f$, $f'$, the distance between the guiding rollers $h$ and $h'$ being less than that between the guiding rollers $f$ and $f'$ or the clamping rollers $k$ and $k'$. All these rollers $f$, $f'$, $k$, $k'$, $h$, $h'$ are mounted in the same vertical plane with the peripheral groove in pulley C. The upper enlarged end of pendulum arm D' is likewise oval in shape and has therein a curved slot through which the shaft $b$ projects and, at its extreme upper end, a lug $c'$ which projects into the cam recess in pulley C. The curvature of the upper face of pendulum D' and that of the lug $c'$ is the same as that of the walls of the cam recess into which lug $c'$ projects. The shaft $b$, studs $d$ and $d'$ are all in the same vertical plane. The centers of curvature of the upper faces of the pendulums are the studs $d$ and $d'$. The rope passes inside of guiding rollers $f$, $f'$, outside of guiding rollers $h$, $h'$, inside of clamping rollers $k$, $k'$, and then around the pulley C in the peripheral groove.

The means for suspending the mechanism in an operative position may be any one of several, but, as illustrated, consists of a hook $n$ passing through the top of frame A, and threaded at its lower portion to receive a nut L between which and the underside of the upper face of frame A is a resilient cushioning washer $m$.

The mode of operation is as follows:—
Assuming the various parts to be in the positions shown in full lines in Figs. 1 and 2, and the pulley as being rotated in a direction indicated by the arrows, it is seen that the pendulum D is in an inclined position to the left at the extreme end of its movement, with the lug $c$ abutting the edge $4'$ of one of the walls of the cam recess, whereas the pendulum D' is in a vertical position. In this position of the pendulum D, the guiding rollers $f$, $f'$ are in their extreme right-hand position. By a rotation of pulley C, as indicated, the upper end of arm D is moved to the right by reason of the contact of the left end of lug $c$ with wall 4 of its cam recess. This causes the guiding rollers $f$, $f'$ to move to the left (Fig. 1). At the same time pendulum D' is moved to the left (Fig. 2) until the left-hand upper face of lug $c'$ abuts the upper wall $4'$ of its cam recess. As these two surfaces meet, the rotation of pulley C is suddenly stopped. Just at the instant of meeting, however, the right-hand edge of lug $c'$ has just cleared the apex L' between the walls $1'$ and 2 (Fig. 2), whereupon the load, acting on the rope, with guiding roller $h'$ as a fulcrum acts on clamping roller $k'$ and suddenly snaps the upper end of pendulum D' to the right. Just at the instant that the upper end of pendulum D' is thus swung suddenly to the right (Fig. 2) its clamping rollers $k$, $k'$ are moved to the left and the right-hand clamping roller $k$ (Fig. 2) tends to clamp the rope between it and the pulley C. At this instant pendulum D is in its middle position, as shown in dotted lines in Fig. 1. Further rotation of the pulley C causes the upper end of pendulum D to be moved to the right (Fig. 1) until the right-hand upper face of lug $c$ abuts the upper wall 1 of the cam recess. As these two surfaces abut, the mechanism is again brought to a sudden stop, but immediately, the left edge of lug $c$ having cleared the apex L'' between cam walls $3'$ and 4, the weight of the load, acting on the rope, the guiding roller $h'$ being used as a fulcrum, moves the guiding rollers $f$, $f'$ suddenly to the right and the upper end of pendulum D to the left into the position shown in Fig. 1 in full lines. Thus it will be seen that for every quarter of a turn of pulley C there occurs two sudden stops with an intermediate release and also a clamping action of roller $k$ on the rope coincident with the release of pendulum D'. It is the succession of these actions which causes the load to descend at a suitable rate. In addition to the retarding effect of the several contacts described, there is that of the clamping action of roller $k$ on the rope and also that of the friction between the lower edges of the lugs $c$ and $c'$ and the walls of the cam recess with which they are in engagement. This friction occurs between said surfaces with the movement of each pendulum from its extreme position to its middle position.

It will be apparent that all these actions will be proportionate to the load applied and therefore tend to keep the velocity of the descent constant for all loads.

It will also be apparent that the mechanism can be operated in a reverse direction and therefore when one load has reached the ground a second load may be applied to the other end of the rope, which end has meanwhile been drawn up in consequence of the descent of the first load.

I claim:—

1. The combination with a rope-carrying pulley, of means for periodically interrupting the rotation of the pulley, comprising cam surfaces carried by said pulley, oscillating members having portions engaging the cam surfaces, and means coöperating with said members and pulley for disengaging said interrupting means.

2. The combination with a rope-carrying pulley, of means for periodically interrupting the rotation of the pulley, comprising cam surfaces on the faces of said pulley, each cam surface on one side of the pulley being arranged in an alternate angular relation with respect to the other, oscillating members having portions engaging said surfaces, and means for disengaging said interrupting means.

3. The combination with a rope-carrying pulley, of means for periodically interrupting the rotation of the pulley, comprising cam recesses in the faces of said pulley, the walls of each cam recess forming a star-shaped surface arranged in an alternate angular relation with respect to the walls of the other cam recess, oscillating members having portions engaging said recesses, and means for disengaging said interrupting means.

4. The combination with a pulley, of a rope extending around said pulley, and means for periodically interrupting the rotation of the pulley, comprising cam surfaces carried by said pulley, oscillating members having portions engaging said cam surfaces, and means on said oscillating members and engaging said rope for disengaging said interrupting means.

5. The combination with a pulley, of a rope extending around said pulley, and means for periodically interrupting the rotation of the pulley, comprising cam surfaces carried by said pulley, oscillating members having portions engaging said cam surfaces, and means consisting of a set of rollers for disengaging said interrupting means and adapted to be operated by the rope.

6. The combination with a pulley of a rope extending around said pulley and means for periodically interrupting the rotation of the pulley, comprising cam surfaces on the faces of said pulley, each cam surface on one side of the pulley being arranged in an alternate angular relation with respect to the other cam surface, oscillating members having portions engaging said cam surfaces, and means consisting of a set of rollers for disengaging said interrupting means, and adapted to be operated by the rope.

7. The combination with a pulley of a rope extending around said pulley and means for periodically interrupting the rotation of the pulley, comprising cam recesses in the faces of said pulley, the walls of each cam recess forming a star-shaped surface arranged in an alternate angular relation with respect to the walls of the other cam recess, oscillating members having portions engaging said recesses, and means consisting of a set of rollers for disengaging said interrupting means and adapted to be operated by the rope.

8. The combination with a pulley of a rope extending around said pulley, and means for periodically interrupting the rotation of the pulley, comprising a cam recess in each face of said pulley, an oscillating member for each recess having a portion engaging said cam recess, rope-guiding means on one of said oscillating members, rope-clamping means on the other of said oscillating members, and fixed rope-guiding means between the rope-guiding and clamping means on said oscillating members.

9. The combination with a pulley mounted in a frame, of a rope, and means for periodically interrupting the rotation of the pulley, comprising a cam recess in each face of said pulley, a pendulum for each recess journaled in said frame, and each pendulum having at its upper end a portion engaging the corresponding cam recess, rope-guiding means on the lower end of one of said pendulums, rope-clamping means on the lower end of the other pendulum, and rope-guiding means mounted in said frame between the rope-guiding and clamping means of said pendulums.

10. The combination with a pulley mounted in a frame, of a rope, and means for periodically interrupting the rotation of the pulley, comprising a cam recess in each face of said pulley, a long pendulum for one recess and a short pendulum for the other recess, each pendulum being journaled in the frame and having a portion at its upper end engaging the corresponding cam recess, rope-guiding means on the lower end of the long pendulum, rope-clamping means on the lower end of the short pendulum, and rope-guiding means mounted in said frame between the rope-guiding and clamping means on said pendulums.

11. The combination with a pulley mounted in a frame, of a rope, and means for periodically interrupting the rotation of the pulley, comprising a cam recess in each face of said pulley, the walls of each cam recess forming a star-shaped surface arranged in an alternate angular relation with respect to the walls of the other cam recess, a pendulum for each recess journaled in the frame, each pendulum having at its upper end a portion engaging the corresponding recess, rope-guiding means on the lower end of one of said pendulums, rope-clamping means on the lower end of the other pendulum, and rope-guiding means mounted in said frame between the rope-guiding and clamping means on said pendulums.

12. The combination with a pulley mounted in a frame, of a rope and means for periodically interrupting the rotation of of the pulley, comprising a cam recess in each face of said pulley, the walls of each cam recess forming a star-shaped surface arranged in an alternate angular relation with respect to the walls of the other cam recess, a long pendulum for one recess and a short pendulum for the other recess, each pendulum being journaled in the frame and having a portion at its upper end engaging the corresponding cam recess, rope-guiding means on the lower end of the long pendulum, rope-clamping means on the lower end of the short pendulum, and fixed rope-guiding means mounted in said frame between the rope-guiding and clamping means on said pendulums.

13. The combination with a pulley having therein a peripheral groove, of means for periodically interrupting the rotation of the pulley, comprising cam recesses in the opposite faces of the pulley, the walls of each recess being arranged in an alternate angular relation with respect to the walls of the other recess, a long pendulum on one side of the pulley having at its upper end a portion engaging one of the cam recesses and at its lower end a pair of guiding rollers mounted on a rigid lug, a short pendulum on the other side of the pulley having at its upper end a portion engaging the other cam recess and at its lower end a pair of clamping rollers mounted on a lug which is pivoted to the pendulum, a fixed pair of guiding rollers located between said guiding and clamping rollers on the pendulums, and a rope passing inside the guiding rollers on the longer pendulum, outside the fixed guiding rollers, inside the clamping rollers, and around the wheel in the peripheral groove.

In testimony whereof I affix my signature in presence of two witnesses.

CARL ALFRED JOHANSSON.

Witnesses:
 J. KOHESSEN,
 A. THRONSEN.

Copies of this patent may be obtained for five cents each, by addressing the "Commissioner of Patents, Washington, D. C."